United States Patent
Sauermann

(10) Patent No.: US 8,998,143 B2
(45) Date of Patent: Apr. 7, 2015

(54) AERODYNAMIC FAIRING DEVICE, AIRCRAFT COMPONENT ARRANGEMENT WITH AN AERODYNAMIC FAIRING DEVICE AND METHOD FOR INSTALLING SUCH A FAIRING PART

(75) Inventor: Axel Sauermann, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/180,856

(22) Filed: Jul. 12, 2011

(65) Prior Publication Data

US 2012/0068016 A1 Mar. 22, 2012

Related U.S. Application Data

(60) Provisional application No. 61/363,348, filed on Jul. 12, 2010.

(30) Foreign Application Priority Data

Jul. 12, 2010 (DE) .......................... 10 2010 026 839

(51) Int. Cl.
*B64C 1/12* (2006.01)
*B64C 7/00* (2006.01)

(52) U.S. Cl.
CPC ...................................... *B64C 7/00* (2013.01)

(58) Field of Classification Search
USPC ............... 244/132, 124, 123, 219, 121, 159.1
See application file for complete search history.

(56) References Cited

U.S. PATENT DOCUMENTS

| | | | | |
|---|---|---|---|---|
| 1,755,886 | A | * | 4/1930 | McKenzie ..................... 244/219 |
| 5,314,144 | A | * | 5/1994 | Porter et al. .................. 244/132 |
| 2008/0164376 | A1 | | 7/2008 | Kato |
| 2008/0258008 | A1 | | 10/2008 | Cooper |

* cited by examiner

*Primary Examiner* — Brian M O'Hara
(74) *Attorney, Agent, or Firm* — Jenkins, Wilson, Taylor & Hunt, P.A.

(57) ABSTRACT

A fairing device for creating an aerodynamic cover for an area of an aircraft structure, including a first fairing part with an outer side forming a first exterior flow contour, and having a fairing section for contacting a first section of the aircraft structure and a connecting section. The first fairing part includes a mounting device for receiving a connecting element. The fairing device includes a second fairing part including a fairing section having an outer side forming a second exterior flow contour and is designed for contacting a second section of the aircraft structure and a connecting section. The shape of the outer side of the second fairing part is adapted to the inner side of the connecting section of the first fairing part in an overlapping area, so the connecting section of the first fairing part forms a joint piece protruding over the second fairing part in the overlapping area.

6 Claims, 7 Drawing Sheets

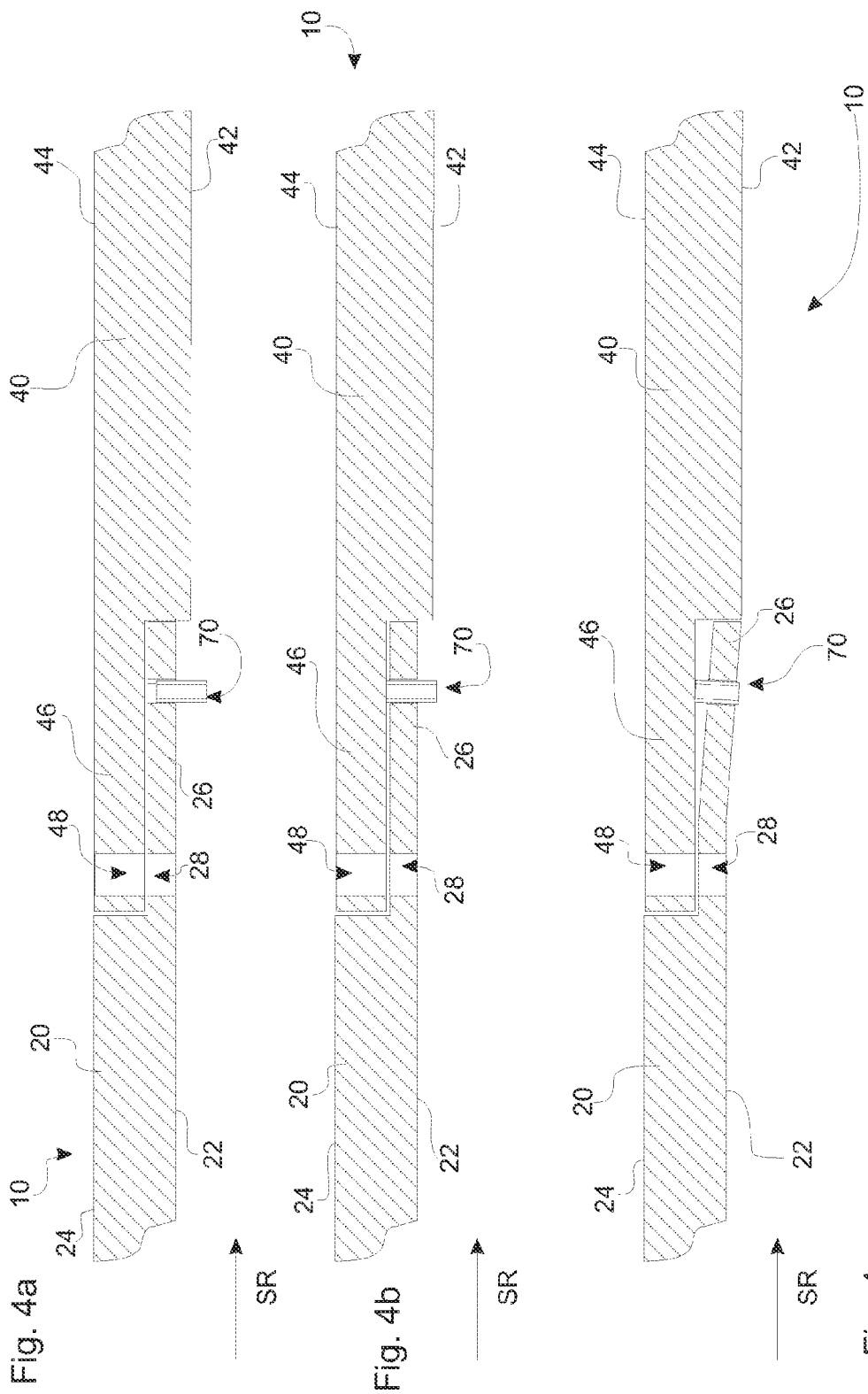

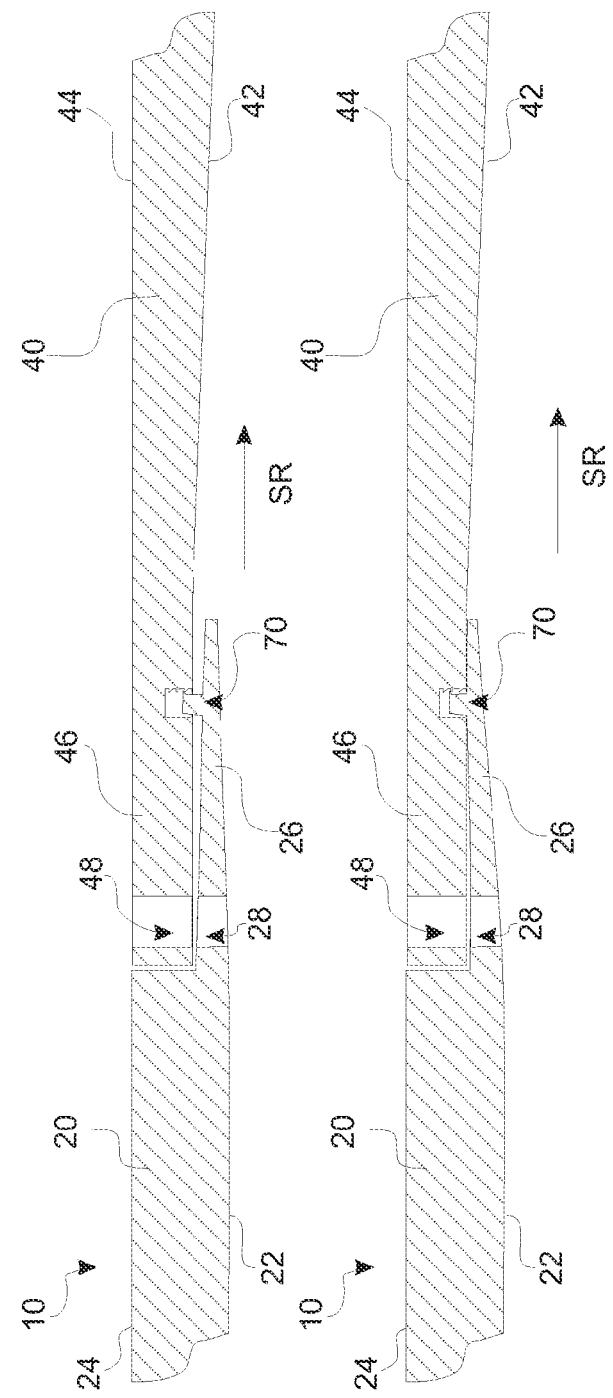

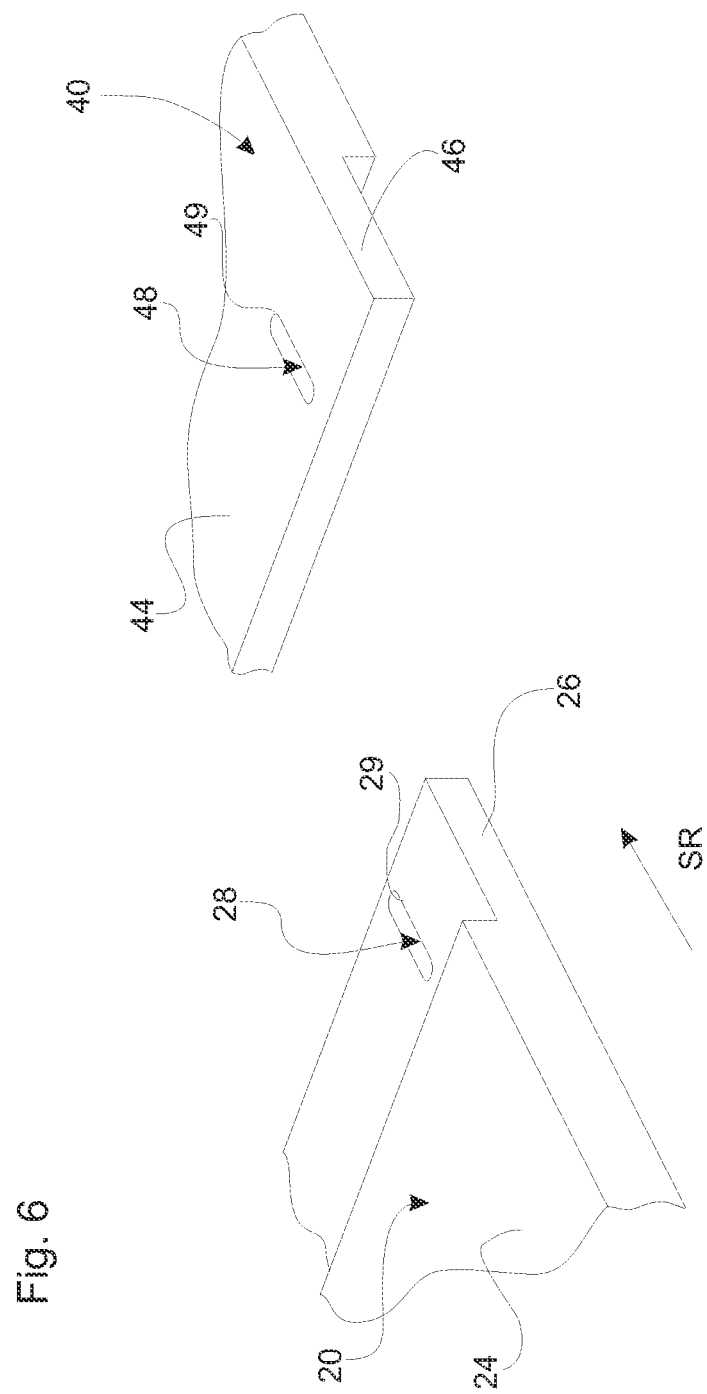

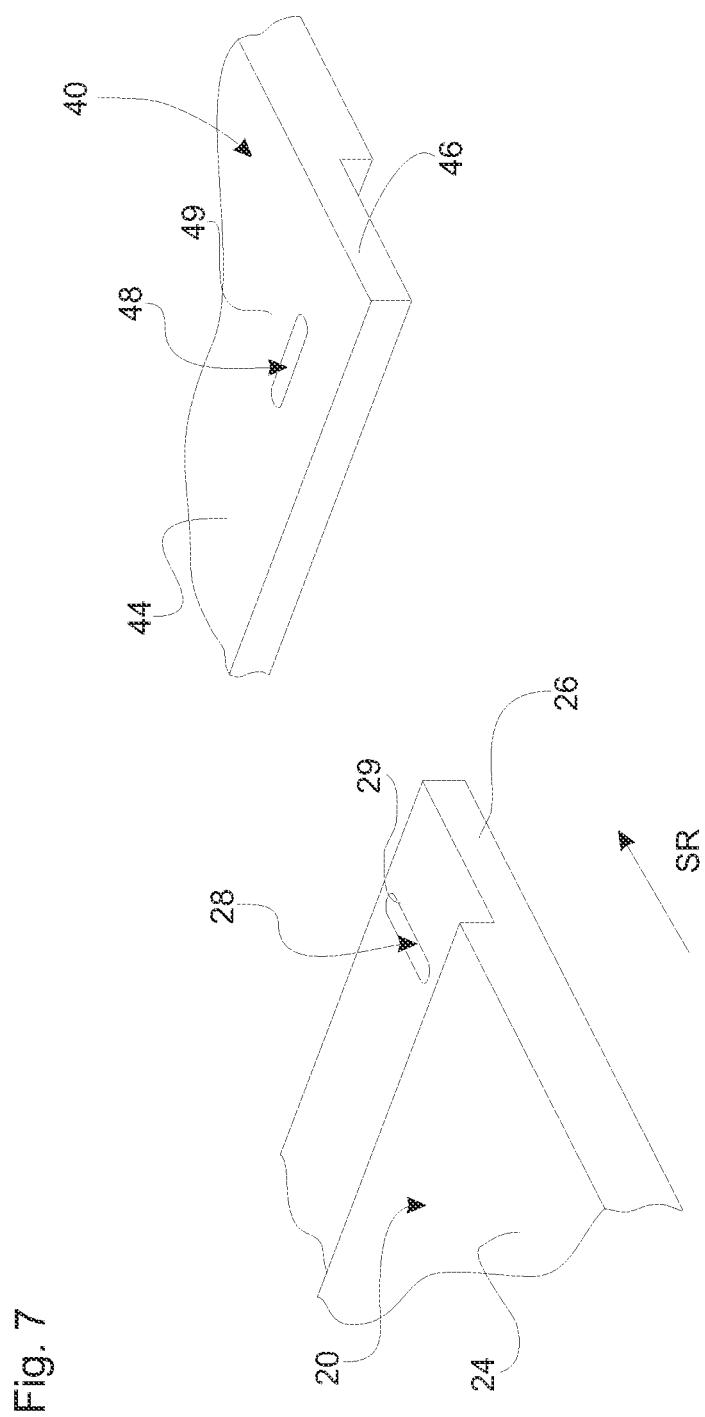

AERODYNAMIC FAIRING DEVICE, AIRCRAFT COMPONENT ARRANGEMENT WITH AN AERODYNAMIC FAIRING DEVICE AND METHOD FOR INSTALLING SUCH A FAIRING PART

CROSS-REFERENCE TO RELATED APPLICATIONS

The present application claims the benefit of U.S. Provisional Application 61/363,348, filed on Jul. 12, 2010. Priority is also claimed from German Application 10 2010 026 839.9, filed on Jul. 12, 2010.

FIELD OF THE INVENTION

Embodiments of the invention pertain to an aerodynamic fairing device, an aircraft component arrangement with an aerodynamic fairing device and a method for installing such a fairing part.

BACKGROUND

Aerodynamic fairing devices or fairing parts for covering a circumfluented structural component of an aircraft are generally known. Such fairing parts usually feature at least two fairing parts that are arranged on the circumfluented structural component in a plate-like fashion. The individual fairing parts jointly form the fairing part and shield the interior of the circumfluented structural component from the circumfluented exterior. In known fairing parts, the individual fairing parts are directly mounted on the circumfluented structural component, particularly on frame elements of the structural component. The mounting of each fairing part is carried out individually. With respect to the aerodynamic properties of the fairing part, the gap between the fairing parts is decisive for the flow around the circumfluented structural component. In this case, particularly the gap between two fairing parts that essentially extends transverse to the flow direction of the circumfluented structural component influences the flow and increases, in particular, the resistance of the structural component against the flow around it. In addition to inferior flight characteristics, a thusly increased drag also results in a higher aerodynamic drag of the wing covered in this fashion and therefore a higher fuel consumption of the aircraft.

In order to prevent this, it has been proposed so far to manufacture the fairing parts with very high accuracy, i.e., with very strict dimensional tolerances. These strict tolerances result in a manufacturing expenditure, particularly a high quota of rejected fairing parts that do not correspond to the narrow dimensional tolerance range. In situations, in which a fairing part needs to be used despite the fact that its dimensions do not lie within the tolerance range or in which the dimensions of a fairing part lie at the boundary of the tolerance range, an additional seal needs to be installed between the fairing parts on-site. In situations, in which individual fairing parts have dimensions that lie above the respective tolerances or at the upper boundary, the corresponding fairing part needs to be cut to size during the installation. In addition to the high manufacturing expenditure of the individual fairing parts caused by the strict specified tolerances, the installation of the known fairing parts therefore is also extremely elaborate.

In addition to possibly required additional work with respect to sealing or cutting the individual fairing parts to size, an explicit measurement of each individual fairing part is required in order to provide comprehensive documentation on the installation of the fairing part on the circumfluented structural component. This documentation is important because the observation of tolerances, particularly the gap sizes of the fairing parts, affect the flight characteristics of the aircraft. Consequently, the utilization of the known fairing parts on the one hand has the disadvantage of very strict dimensional tolerances, as well as the high costs associated therewith, and on the other hand requires elaborate measuring and documentation work during the installation.

SUMMARY

Embodiments of the invention provide an aerodynamic fairing device and a corresponding aircraft component arrangement that can be manufactured with significantly broader tolerances and for which only few or no measuring processes have to be carried out and documentation regulations have to be fulfilled during the installation for covering a circumfluented structural component of an aircraft. Embodiments of the invention also provide a method for installing such an exterior fairing device on a corresponding aircraft component arrangement.

In comparison with the prior art, the aerodynamic fairing device or exterior fairing device according to various embodiments of the present invention are enhanced to the effect that the flow around the circumfluented structural component is improved in the flow direction in the area of the fairing part by avoiding a gap between the individual fairing parts.

In accordance with embodiments of the invention, an aerodynamic exterior fairing device or an aerodynamic fairing part, in particular, for being arranged on an aircraft structure is proposed. The exterior fairing device features:
  at least one first fairing part that has an outer side forming a first exterior flow contour and is composed of a fairing section designed for contacting a first section of the aircraft structure and a connecting section in certain areas,
  a second fairing part that is composed of a fairing section that has an outer side forming a second exterior flow contour and is designed for contacting a second section of the aircraft structure and a connecting section in certain areas.

The first and the second fairing part and, in particular, their fairing sections may be respectively realized in the form of a shell part. The fairing sections or one of the fairing sections may be provided and realized in their/its planar extension, in particular, for covering fluidically unfavorable areas or sections of the aircraft structure. According to various embodiments of the invention it is proposed, in particular,
  that the connecting section of the first fairing part forms a joint piece that at least partially covers the second fairing part in an overlapping area,
  that the contour of the outer side of the connecting section of the first fairing part and the contour of the inner side of the connecting section of the first fairing part are at least sectionally adapted to one another with respect to their shape in the overlapping area,
  that the first fairing part and the second fairing part respectively feature a mounting device for receiving at least one connecting element for thusly connecting the fairing parts.

In this case, the shape of the second fairing part may be realized such that it can be brought in contact with a third section of the aircraft structure on its inner side and that the first and the second fairing part can be mounted on the aircraft structure in the connected state by means of the at least one connecting element.

If the contour of the outer side of the connecting section of the second fairing part and the contour of the inner side of the connecting section of the first fairing part respectively are at least sectionally adapted to one another with respect to their shape in the overlapping area, the outer side of the connecting section of the second fairing part and the contour of the inner side of the connecting section of the first fairing part may, in particular, at least sectionally contact one another in the overlapping area or extend along one another at a small maximum distance of, in particular, up to 10 mm.

The fairing device according to embodiments of the invention therefore is provided with a connecting section that at least sectionally forms a rear edge section of the first fairing part with reference to the flow direction on the outer side of the first fairing part. In this context, the term "rear edge section" therefore refers to the section of the fairing part that lies in the rear area of the fairing part with reference to the flow direction. This rear edge section is at least partially formed by a connecting section that may come into correlation with the second fairing part. The second fairing part is provided with an overlapping section that is arranged on the outer side toward the rear edge section of the first fairing part referred to the flow direction, namely in such a way that the inner side of the connecting section of the first fairing part lies at least sectionally opposite of the outer side of the overlapping section of the second connecting element. In other words, the first fairing part and the second fairing part overlap in the area of the rear edge section of the fairing part. The connecting section of the first fairing part and the overlapping section of the second fairing part serve for producing the overlap. The overlapping direction extends along the flow direction such that the connecting section is situated above the overlapping section.

The fairing device in accordance with various embodiments of the invention is furthermore provided with at least one mounting device that is designed for locally fixing the first fairing part relative to the second fairing part. The local fixing of the two fairing parts relative to one another serves for defining the overlap of the two fairing parts. The definition of this overlap by means of the mounting device serves for permanently defining the characteristic of the overlap during the entire use of the fairing.

The mounting device of the first fairing part and the mounting device of the second fairing part may respectively be realized in the form of at least one opening. The at least one connecting element may furthermore be realized such that the at least one connecting element can be inserted into the openings of the two fairing parts in order to connect said fairing parts. Due to the utilization of an fairing part in accordance with various embodiments of the invention, the manufacture of the individual fairing parts can be carried out with significantly broader tolerances. In this case, it is decisive that a gap between the first fairing part and the second fairing part is avoided at least transverse to the flow direction due to the overlap in at least the flow direction. The overlap, in a manner of speaking, covers the otherwise detectable gap. Since the gap is avoided, a location that usually is responsible for strong turbulences and therefore a high aerodynamic drag is aerodynamically covered and the flow on the outer side of the fairing parts therefore is decisively improved. From an aerodynamic point of view, it is irrelevant how far this overlap is realized. It is merely important that substantially no gap remains between the two fairing parts in the area of the overlap.

In this way, the design of the connecting section and of the overlapping section with sufficient dimensions makes it possible to achieve a situation that allows the manufacture of the individual fairing parts with broad tolerance ranges. For fairing parts, the dimensions of which both lie at the lower tolerance boundary, the overlap therefore is reduced to a minimum, wherein this overlap is increased to a maximum in the other extreme instance, in which the dimensions of both fairing parts lie at the upper end of the tolerance range. In this case, the size of the overlap is irrelevant for the aerodynamic effect of the fairing parts in accordance with embodiments of the invention. It is decisive that an overlap exists in the first place in order to avoid a gap between the individual fairing parts.

In this case, the mounting device for fixing the two fairing parts relative to one another may not only serve for fixing the fairing parts, but also for defining the position of the fairing part on the circumfluented structural component. It is possible, for example, to mount the fairing part on the structural component such as, for example, on a mechanically stabilizing frame of the structural component by means of the mounting device. However, it would also be conceivable that the mounting device only acts between two fairing parts, i.e., mechanically connects two fairing parts to one another, at least at individual locations between these two fairing parts.

Any fairing part intended for use as a fairing of a circumfluented structural component of an aircraft is usually manufactured with a sandwich structure. In this case, a honeycomb-like structure or a framework structure centrally extends in the thickness direction of the fairing part and is covered with a layer of solid material such as, for example, a composite fiber material on both lateral surfaces. This sandwich structure ensures a high stability of the respective fairing part despite a very lightweight construction. In one embodiment of the fairing part, it may be advantageous if the overlapping section and/or the connecting section of the respective fairing part only feature/features one of these two solid material layers, but not the framework structure or honeycomb structure situated in between. An increased stability due to the support by means of the honeycomb structure or the framework structure is also not required in this case because this merely concerns the edge area of the respective fairing part that also can transmit a force to the other respective fairing part or even the structural component by means of the mounting device. Consequently, an additional support by means of a framework structure or honeycomb structure is not required at this location.

In addition to the manufacture within broad tolerance ranges, the utilization of fairing parts or fairing devices in accordance with various embodiments of the invention provides the advantage that assembly tolerances of the entire aircraft can also be compensated at this position. For example, it is common practice to construct an aircraft section-by-section along its fuselage. Since unavoidable deviations from the exact design dimensions add up with the very large components of an aircraft despite their exact construction with strict tolerances, situations may arise, in which significant added deviations from the design dimensions may result at the location of the fairing parts. This addition of assembly tolerances of the fuselage neither can be constructively predicted nor otherwise taken into account in the prepared fairing parts with respect to the manufacturing technology. In the known fairing parts, this assembly tolerance also results in the necessity to partially cut to size the individual fairing parts during the installation or to additionally seal gaps between the individual fairing parts. This assembly tolerance also cannot be influenced with very strict manufacturing tolerances of the fairing parts. The utilization of the fairing device with at least two fairing parts that, according to various embodiments of the invention, may overlap therefore not only compensates the manufacturing tolerances of the individual fairing parts, but also the assembly tolerance of the entire fuselage of the aircraft. This means that not only the manufacture of the individual fairing parts, but also the assembly of the entire aircraft becomes easier, faster and more cost-efficient.

Another feature of the fairing device in accordance with various embodiments of the present invention is the fact that the front edge of the second fairing part cannot protrude opposite to the flow of the circumfluented structural component due to the overlap of the first fairing part over the second fairing part, i.e., the covering of this front edge. In other words, the front edge of the second fairing part is, in a manner of speaking, removed from the flow. In the known fairing parts that usually feature such a gap, it may not only occur that turbulences penetrate into the gap during any type of flow, but that the second fairing part at least sectionally protrudes over the first fairing part opposite to the flow in the thickness direction of the fairing part. Consequently, the flow of the circumfluented structural component not only engages on the gap itself, but also on the front edge of the second fairing part, i.e., the rear fairing part. In addition to an even higher aerodynamic drag, this is also disadvantageous for reasons of stability because the air flow on the circumfluented structural component may usually feature eroding elements such as, for example, interspersed aerosols. The circumfluenting air consequently erodes such a protruding front edge of the second fairing part and therefore drastically reduces the service life of the respective fairing part.

A fairing device may be additionally developed in such a way that the mounting device features at least one mounting element and one respective opening is provided in the connecting section of the first fairing part and in the overlapping section of the second fairing part. In this case, the mounting device is realized in such a way that the fairing part can be mounted on the circumfluented structural component by means of the mounting element through the openings of the two fairing parts. In other words, the mounting device thusly not only serves for fixing the location of the two fairing parts relative to one another, but also for mounting the entire fairing part on the circumfluented structural component. In this case, the mounting is realized, in particular, on a mechanically stabilizing frame of the structural component. For example, the mounting element may be realized in the form of a screw or rivet that is inserted through the two openings in the two fairing parts and connected to the circumfluented structural component, particularly its mechanically stabilizing frame. When using a screw connection, the mounting itself is realized by screwing a screw into a corresponding thread of the circumfluented structural component. When using a rivet connection, a rivet is inserted through the openings in the two fairing parts and fixed in a corresponding opening in the circumfluented structural component by means of riveting.

In this case, the mounting device features corresponding recesses or holes or bores in the structural component, as well as in the fairing parts. With respect to their inside diameter, these holes may be larger than the outside diameter of the mounting element. This makes it possible to compensate an offset between the two fairing parts without preventing the mounting element from mounting the fairing part through the openings.

A fairing device may furthermore be additionally developed such that the mounting device is realized in such a way that the fairing parts can, regardless of different positions of the fairing parts relative to one another in the direction along the flow direction, be locally fixed relative to one another in these positions. In other words, not only the manufacturing tolerances of the fairing parts, but also the assembly tolerances of the fuselage can be compensated in a particularly advantageous fashion. The openings or the areas of a structural component that should be covered by means of a fairing part and on which the fairing parts need to be arranged, are firmly defined on the structural component. They depend, among other things, on the assembly tolerances that inevitably apply to the assembly of the aircraft fuselage and add up over the individual sections of the fuselage. In other words, the position of each fairing part is defined. In order to place each fairing part into the intended position on the one hand and to allow an overlap of the individual fairing parts in accordance with various embodiments of the invention on the other hand, the mounting device is advantageously variable with respect to the position of individual fairing parts relative to one another. This variability improves the flexibility of use and makes it possible for the fairing parts to not only compensate their own manufacturing tolerances, but also the assembly tolerances of the aircraft. For this purpose, in particular, openings in the fairing parts intended for leading through mounting elements are provided in the mounting device, wherein these openings have an inside diameter that is larger than the outside diameter of the mounting element. In this case, the openings may be realized, in particular, in the form of elongated holes that allow the relative position with respect to the flexibility of the mounting device of the individual fairing parts within an even broader tolerance range.

A fairing device may be additionally developed such that the first fairing part features in its connecting section or the second fairing part features in its overlapping section at least one opening in the form of an elongated hole that corresponds to the opening in the opposing section. Such an elongated hole makes it possible to vary the position of the individual fairing parts relative to one another. As already explained in the preceding paragraph, this variation makes it possible to compensate assembly tolerances of the aircraft.

In this case, it may be advantageous if the elongated hole extends along the flow direction on the outer side of the fairing parts. However, it would also be conceivable that the elongated hole extends transverse to the flow direction along the outer side of the fairing parts. Depending on the direction, in which the elongated hole extends, assembly tolerances, as well as manufacturing tolerances, can be compensated in the corresponding orientation of the elongated hole. In this case, at least one opening in the form of an elongated hole may be advantageously provided in each of the two fairing parts. These two elongated holes in the corresponding fairing parts correspond to one another and therefore serve for additionally improving the flexibility in compensating assembly tolerances. This applies, in particular, if the individual elongated holes that correspond to one another are oriented in different directions referred to the flow direction on the outer side of the fairing parts. It may be particularly sensible if one of the two elongated hole extends along the flow direction and the second of the two elongated holes extends transverse to this flow direction on the outer side of the fairing parts. In this way, an essentially free option for two-dimensionally compensating the two fairing parts relative to one another is created.

The fairing device in accordance with various embodiments of the invention has a design, in which the connecting section of the first fairing part and/or the overlapping section of the second fairing part are/is realized in such a way that, when arranging the second fairing part behind the rear edge section of the first fairing part referred to the flow direction, a transition without a step is formed between the two fairing parts due to the overlap between the connecting section and the overlapping section. Such an embodiment can be realized, for example, by designing the connecting section of the first fairing part in a wedge-shaped fashion. In this way, a step between the two fairing parts is also prevented in addition to achieving the basic objective of avoiding a gap. Although this step has a significantly weaker negative effect on the flow of the circumfluented structural component than a gap between the fairing parts, the flow could also be influenced in the form of turbulences in this case. The reduction of the step between the two fairing parts, particularly a transition between the two fairing parts without a step, represents another advantage with respect to improving the flow around the circumfluented structural component and the reduction of its aerodynamic drag. In addition to an embodiment in the form of an element that is tapered in a wedge-shaped fashion, the connecting section may also extend toward the second fairing part in the form of a lip. Such a lip, in a manner of speaking, reduces the transition resistance of the flow from the first fairing part to the second fairing part.

It may also be advantageous if the fairing device is provided with an adjustment device that is designed for adjusting the distance between the outer side of the overlapping section of the second fairing part and the inner side of the connecting section of the first fairing part. Such an adjustment is a basic adjustment of the distances between the two fairing parts, as well as an adjustment of the connecting section and the overlapping section relative to one another. In this case, the relative adjustment may be realized, for example, due to the flexibility of the material of the respective fairing part such that slight bending of the respective section takes place. This bending could conceivably be realized, for example, with the aid of a set screw that spaces apart the connecting section from the overlapping section due to its contact with the outer side of the overlapping section of the second fairing part and a threaded guide in the connecting section of the first fairing part when it is turned and correlates with the thread. It would also be conceivable, for example, to use latching systems that engage at the desired spacing. In this way, for example, the step between the two fairing parts can be additionally reduced while still ensuring a simple installation. Such an adjustment device therefore serves for compensating another tolerance in addition to the assembly tolerance and the manufacturing tolerance. In this case, the tolerance with respect to the thickness of the respective fairing part can be compensated. Such an adjustability by means of the adjustment device may advantageously be non-recurring such that, for example, an automatic fixing subsequently takes place. This type of fixing can be realized with latching systems as they are known, for example, from cable ties.

The fairing device may be additionally developed in such a way that the inner side of the connecting section of the first fairing part and/or the outer side of the overlapping section of the second fairing part at least sectionally have/has a surface with a reduced coefficient of friction. In such an embodiment, the stability of an fairing part in accordance with embodiments of the invention is additionally improved. Particularly in situations, in which the inner side of the connecting section and the outer side of the overlapping section lie on top of one another after the assembly of the fairing parts, it may occur that the two fairing parts move relative to one another during the utilization of the aircraft, i.e., during flight situations. Such a relative movement also is automatically followed by a movement of the inner side of the connecting section relative to the outer side of the overlapping section. This relative movement of the contacting surfaces can lead to friction and to erosion or corrosion due to said friction. In order to avoid this and to lower the risk of reducing the stability of the fairing part, it is advantageous if a reduced coefficient of friction is provided on at least one of these two surfaces. This reduction of the coefficient of friction can be achieved, for example, with a surface treatment, i.e., by means of grinding, or with a coating or a glued-on film. In this case, Teflon or PTFE may be used, for example, as materials for the coating or the film.

The fairing device may be realized such that the second fairing part also features a connecting section with the characteristics of the connecting section of the first fairing part and/or the second fairing part also features an overlapping section with the characteristics of the overlapping section of the second fairing part. In other words, the individual fairing parts may essentially be realized identical to one another such that they can be used even more flexibly. In this way, it is possible, in particular, to arrange a cascade of several fairing parts, particularly more than two fairing parts, successively in the flow direction. In such an instance, the connecting section of the first fairing part overlaps an overlapping section of the second fairing part and, referred to the flow direction, a connecting section of the second fairing part furthermore overlaps the overlapping section of a third fairing part, etc. In this way, the fairing part is standardized such that only a single fairing part needs to be provided for all fairing parts of the fairing part in the simplest case. Due to the focus on a single fairing part, this reduces the costs with respect to the construction and manufacture of this fairing part.

According to another aspect of various embodiments of the invention, an aircraft component arrangement with an aerodynamic fairing device for creating an aerodynamic exterior cover for an area of an aircraft structure with a first section, a second section and a third section of the aircraft structure that is situated in between the first section and the second section and realized, in particular, in the form of a supporting component is proposed. The fairing device may be realized in accordance with an embodiment and feature, in particular, at least one first fairing part that has an outer side forming a first exterior flow contour and is composed of a fairing section designed for contacting a first section of the aircraft structure and a connecting section in certain areas, a second fairing part that is composed of a fairing section that has an outer side forming a second exterior flow contour and is designed for contacting a second section of the aircraft structure and a connecting section in certain areas, wherein it is furthermore proposed that the connecting section of the first fairing part forms a joint piece that at least partially covers the second fairing part in an overlapping area, that the contour of the outer side and the contour of the inner side of the connecting section of the first fairing part are at least sectionally adapted to one another with respect to their shape in the overlapping area, that the first fairing part and the second fairing part respectively feature a mounting device for receiving at least one connecting element for thusly connecting the fairing parts, that the shape of the second fairing part is realized in such a way that it contacts a third section of the aircraft structure on its inner side such that the first and the second fairing part can be mounted on the aircraft structure in the connected state by means of the at least one connecting element.

In the aircraft component arrangement, the connecting section of the first fairing part and/or the overlapping section of the second fairing part may be realized in such a way that, when arranging the second fairing part behind the rear edge section of the first fairing part referred to the flow direction, a transition without a step is formed between the two fairing parts due to the overlap between the connecting section and the overlapping section.

Embodiments of the present invention also encompass a method for installing a fairing device on a circumfluented structural component which includes:
providing at least one first fairing part and at least one second fairing part,
arranging the second fairing part in its intended position on the structural component,
arranging the first connecting element in its intended position on the structural component such that the inner side of the connecting section of the first fairing part at least sectionally lies opposite of the outer side of the overlapping section of the second connecting element, and
mounting the fairing part on the structural component with the aid of the mounting device while locally fixing the first fairing part relative to the second fairing part.

In this method, a fairing part in accordance with various embodiments of the invention is used. Furthermore, the second connecting element is mounted in its intended position on the structural component in a first step and the first connecting element is subsequently mounted in its intended position on the structural component. This ensures that an overlap between the two fairing parts is produced in accordance with embodiments of the invention. In this way, it can be ensured, in particular, that the connecting section of the first fairing part lies outside the overlapping section of the second fairing part and the overlap therefore extends in the direction of the flow direction on the outer side of the fairing parts, i.e., that the overlapping direction is defined.

Embodiments of the present invention also encompass an airfoil of an aircraft that features at least one fairing part in accordance with various embodiments of the invention. Through the utilization of such fairing parts for airfoils, the costs for the manufacture of the entire airfoil can be reduced. This is achieved due to the fact that fairing parts in accordance with various embodiments of the invention can be manufactured more cost-efficiently because lower tolerance accuracies are required. Furthermore, additional costs due to the documentation and measuring of the delivered fairing parts during the installation are eliminated such that the assembly costs and therefore the manufacturing costs of the airfoil are reduced. The utilization of such an airfoil furthermore creates less aerodynamic drag and therefore saves fuel.

BRIEF DESCRIPTION OF THE DRAWINGS

Embodiments of the present invention are described in greater detail with reference to the attached drawings. In this respect, the terms "left," "right," "top" and "bottom" used in the description refer to the orientation of the drawings with normally legible reference symbols. In these drawings:

FIG. 4a shows another embodiment of a fairing part in the form of a cross section;

FIG. 4b shows the fairing part of FIG. 4a in another position;

FIG. 4c shows the fairing part of FIGS. 4a and 4b in another position;

FIG. 5a shows another embodiment of a fairing part in the form of a cross section;

FIG. 5b shows the fairing part of FIG. 5a in another position;

FIG. 5c shows the fairing part of FIGS. 5a and 5b in another position;

FIG. 6 shows another embodiment of a fairing part prior to the assembly in the form of an isometric view; and FIG. 7 shows another embodiment of a fairing part prior to the assembly.

DESCRIPTION

Figure 1:
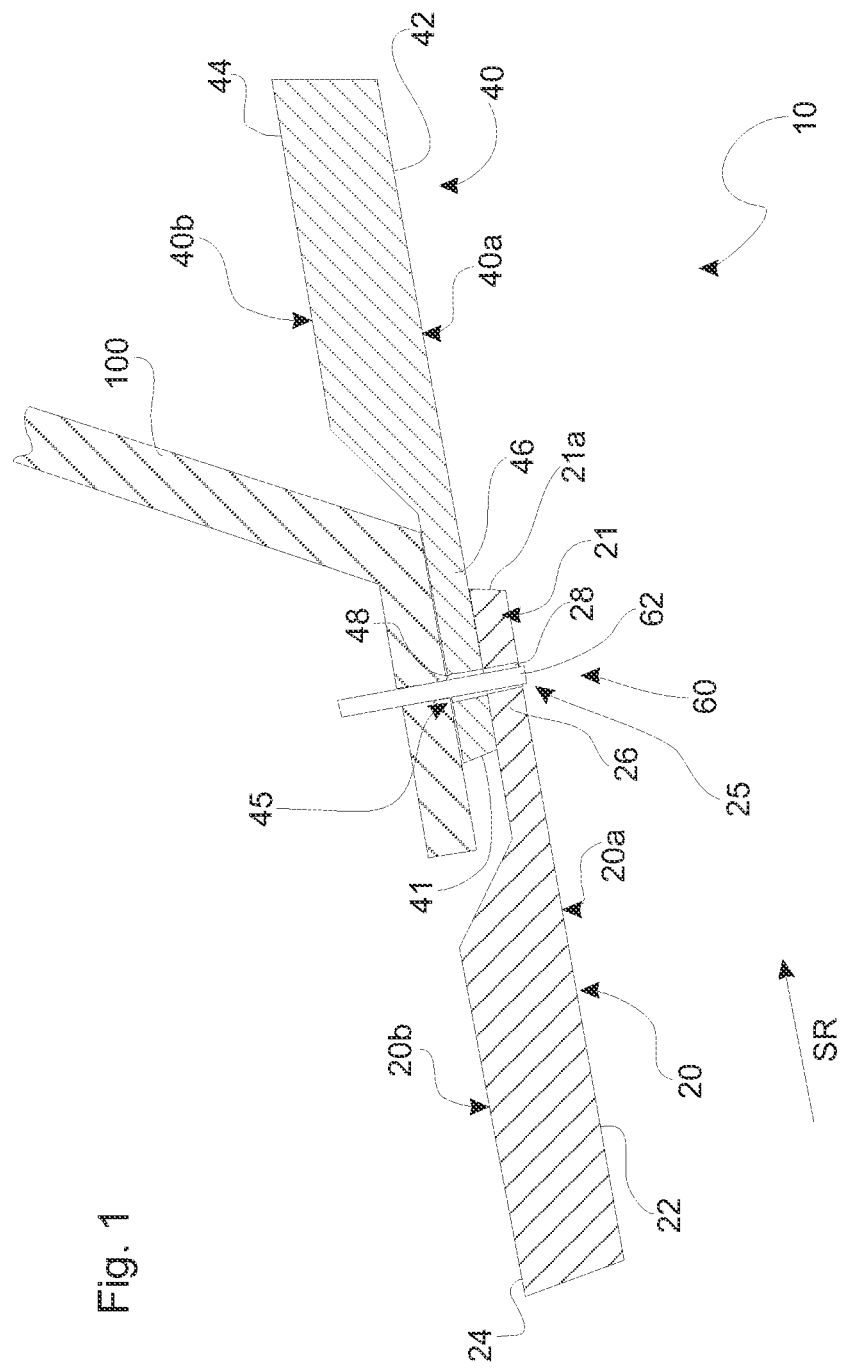
FIG. 1 shows a first embodiment of a fairing part in the form of a cross section.

FIG. 1 shows a first embodiment of the fairing device 10 that serves for forming an aerodynamic outer cover for an area of an aircraft structure. In the embodiment shown in FIG. 1, this fairing device 10 is already mounted on a section 100a of a structural component 100. The fairing device 10 features a first fairing part or fairing element 20 and a second fairing part or fairing element 40.

The first fairing part 20 is illustrated in the form of a cross section in FIG. 1. In this case, the fairing part 20 has an inner side 20b20b and an outer side 20a. Furthermore, a second fairing part 40 arranged or to be arranged on the first fairing part is provided, wherein this second fairing part also has an inner side 40b and an outer side 40a. The fairing parts 20, 40 that form the fairing device are intended for being arranged in an area of an aircraft structure in order to sectionally cover this area aerodynamically. This is particularly advantageous at locations of the aircraft structure, at which the aircraft structure does not have an aerodynamic partial exterior shape such as, e.g., at the airfoil-fuselage transitions or the so-called Belly-Fairing. The fairing device can also be used, in particular, for modifying already existing fairing devices in order to realize these fairing devices with more favorable aerodynamic properties or for altering the shape of an interior enclosed by said fairing devices.

When the first fairing part 20 is installed, an air flow flows along the outer side 20a of the first fairing part 20 in the flow direction SR indicated in FIG. 1. A connecting section 26 with a rear edge section 21 is realized on the rear end of the first fairing part referred to the flow direction SR, wherein said connecting section features a mounting device 25, particularly in the form of at least one receptacle for the insertion of one respective connecting element. The first fairing part 20 is composed of a fairing section 22 (having a first body portion 24) and a connecting section 26. The outer side 20a of the first fairing part 20 forms a flow contour surface when the fairing device 10 is installed on the structural component. In this case, the first fairing part 20 is oriented in such a way that the connecting section 26 thereof is at least sectionally situated on the rear edge area 21 referred to the flow direction SR. The first fairing part 20 is realized, in particular, in the form of a shell part. In this case, the connecting section 26 may have a smaller thickness than the fairing section 22. The inner side 20b and the outer side 20a of the first fairing part 20 are formed by the inner side and outer sides of the fairing section 22 and of the connecting section 26.

The outer side 40a of the second fairing part 40 also forms a flow contour surface when the fairing device 10 is installed on the structural component. In this case, the second fairing part 40 is oriented in such a way that the connecting section 46 thereof is at least sectionally situated on the front edge area 41 referred to the flow direction SR. The connecting section 46 of the second fairing part 40 features a mounting device 25, particularly in the form of at least one receptacle for the insertion of one respective connecting element.

The second fairing part 40 is also realized, in particular, in the form of a shell part, wherein the connecting section 46 may have a smaller thickness than the fairing section 42, which has a second body portion 44.

The fairing sections 22, 42 serve for forming an aerodynamically favorable two-dimensional fairing or cover for areas of the structural component.

When coupling the first fairing part 20 to the second fairing part 40, the connecting section 46 of the second fairing part 40 and the connecting section 26 of the first fairing part 20 mutually form an overlapping section that lies on the left end of the fairing part 40 in FIG. 1. The overlap between the two fairing parts 20 and 40 is also produced in this area. In this case, the connecting section 26 of the first fairing part 20 overlaps the overlapping section 46 of the second fairing part 40. This overlap is produced in that the outer side 40a of the second fairing part 40 in the area of the overlapping section 46 lies opposite of the inner side 20b of the first fairing part 20 in the area of the connecting section 26. This position relative to one another produces an overlap between the two fairing parts 20 and 40 as shown in FIG. 1. In this case, the overlapping direction extends along the flow direction SR such that a gap extending transverse to the flow direction SR is avoided between the two fairing parts 20 and 40.

In addition, the embodiment illustrated in FIG. 1 also features a connecting area or a mounting arrangement 60. The mounting arrangement 60 is schematically illustrated in this figure and extends through two openings 28 and 48 in the connecting section 26 of the first fairing part 20 and in the overlapping section 46 of the second fairing part 40. The mounting arrangement 60 may also feature, in particular, an opening in the structural component 100, into which the connecting element 62 is inserted. The mounting arrangement 60 according to the embodiment shown in FIG. 1 features the mounting element or connecting element 62 that extends through the two openings 28 and 48 in the two fairing parts 20 and 40 and is mounted in the structural component 100 by being fixed in the opening arranged therein. The design of the mounting element 62 on the outer side 20a of the first fairing part 20 is not illustrated in greater detail. In this case, a riveting or screw connection may be realized or a nut may, in contrast, be attached onto the mounting element 62 in order to fix the positions of the two fairing parts 20 and 40 relative to one another. In addition, the mounting arrangement 60 according to FIG. 1 also defines the position of the fairing device 10 relative to the structural component 100 in that it mounts the fairing device 10 on the structural component 100.

Figure 2:
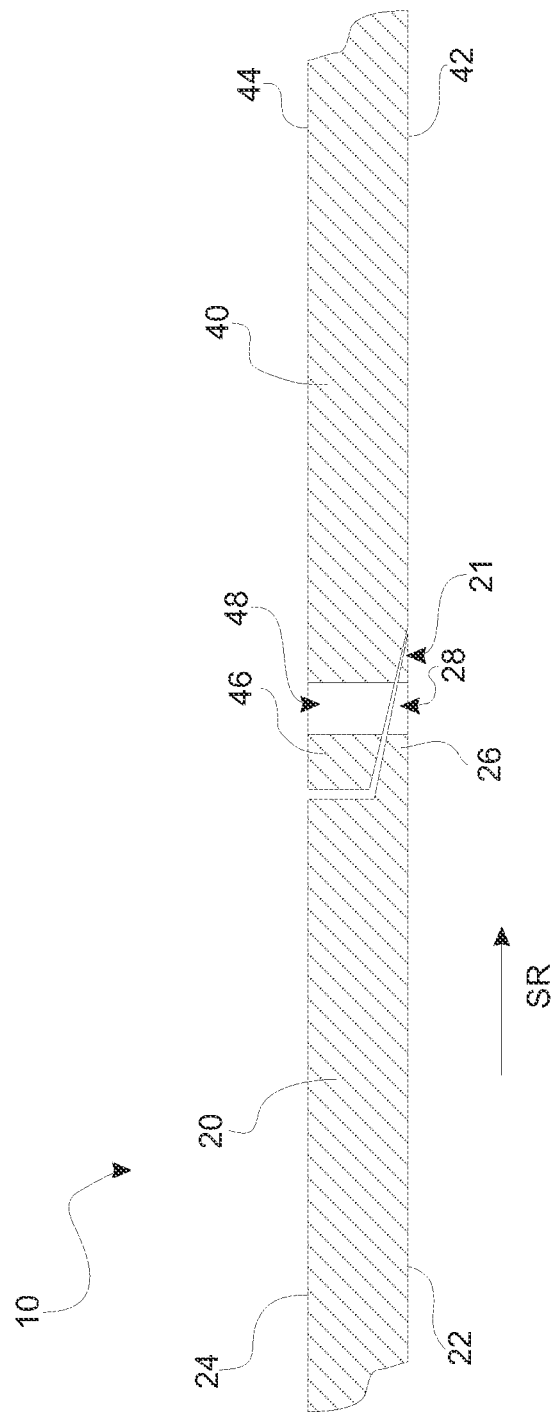
FIG. 2 shows a second embodiment of a fairing part in the form of a cross section.

FIG. 2 shows another embodiment of a fairing device 10. In this embodiment, as well as in the embodiments illustrated in the following figures, the structural component 100 is not shown in order to provide a better overview. In all embodiments described below, however, the connection between the structural component 100 and the fairing device 10 may be realized identical or similar to the preceding description of FIG. 1.

In comparison with the embodiment shown in FIG. 1, the embodiment according to FIG. 2 features a modified overlapping section 46 of the second fairing part 40, as well as a correspondingly adapted connecting section 26 of the first fairing part 20. In this case, the connecting section 26 of the first fairing part 20 is essentially realized in a wedge-shaped fashion such that its extension in the thickness direction is reduced in the flow direction SR. In this case, the connecting section 26 may be essentially tapered on the outermost end of the first fairing part 20. In order to ensure that the first fairing part 20, particularly the connecting section 26, has a sufficient mechanical stability in such instances, it may be advantageous to provide an additional mechanical reinforcement or a mechanically reinforcing material in this area. One advantage of the embodiment according to FIG. 2 is the fact that not only the gap between the two fairing parts 20 and 40 is avoided, but that a step between the two fairing parts 20 and 40 is also reduced to a minimum. In the ideal case, i.e., an absolutely tapered end of the connecting section 26 of the first fairing part 20, the step would completely disappear. In reality, however, at least a small shoulder would remain between the outermost end of the connecting section 26 of the fairing part 20 on the one hand and the second fairing part 40 on the other hand for reasons of mechanical stability and manufacturing technology. In comparison with the embodiment shown in FIG. 1, however, this step is reduced many times over such that the fluidic effects of this step were also reduced to a minimum.

Figure 3:
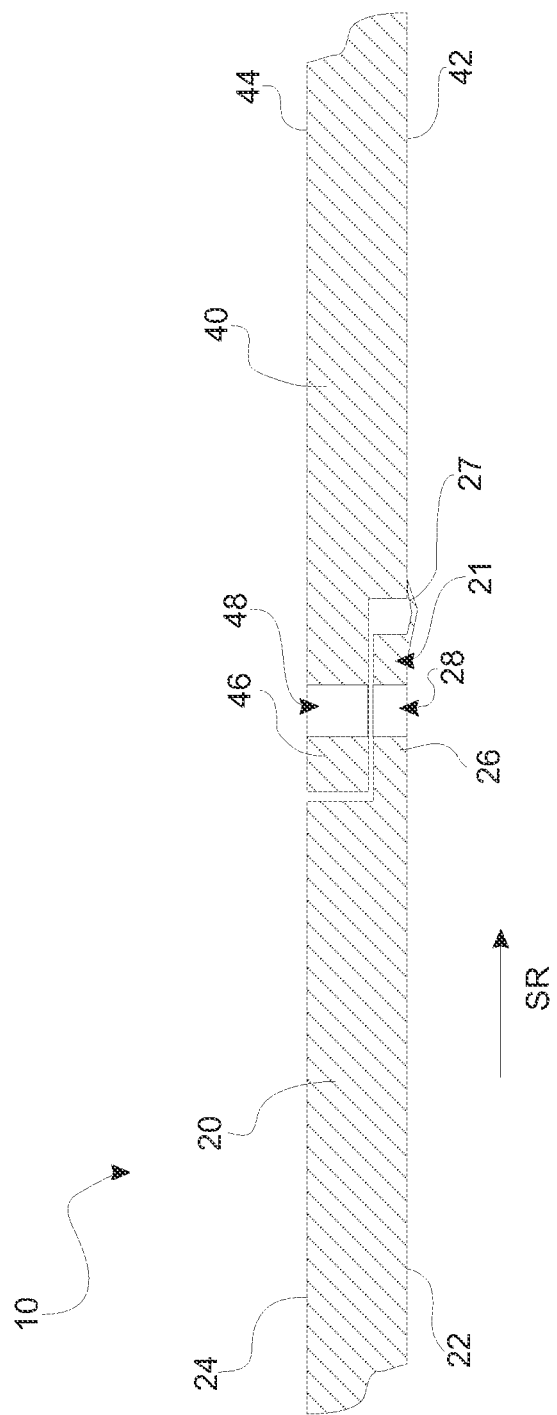
FIG. 3 shows another embodiment of a fairing part in the form of a cross section.

FIG. 3 shows another embodiment of a fairing device 10. The fairing parts 20 and 40 illustrated in this figure are arranged behind one another with reference to the flow direction SR in the same fashion and respectively equipped with an overlapping section 46 and a connecting section 26. In order to enable the two fairing parts 20 and 40 to abut on one another without or largely without a gap regardless of dimensional tolerances, a connecting section 26 is also arranged above the overlapping section 46 in this case. However, a residual gap remains between the outermost end of the connecting section 26 of the first fairing part 20 and the second fairing part 40 on the outer side 40a thereof. In order to also cover this residual gap, a sealing lip 27 is provided that contacts the outer side 40a of the second fairing part 40 under low mechanical tension. This sealing lip therefore spans the remaining gap between the two fairing parts 20 and 40 similar to a bridge and therefore prevents such a gap from negatively affecting the flow. In addition, the sealing lip 27 also serves for essentially creating a transition without a step between the first fairing part 20 and the second fairing part 40 in the flow direction SR.

An option for compensating other tolerances or dimensional errors during the installation of a fairing device 10 is elucidated below with reference to FIGS. 4a to 4c. This concerns an active compensation of possible tolerance inaccuracies. The embodiment illustrated in FIG. 4a basically corresponds to the embodiment shown in FIG. 3. However, no sealing lip 27 is provided in this case, wherein the connecting section 26 of the first fairing part 20 and the overlapping section 46 of the second fairing part 40, in essence, rather mutually overlap. In this case, the thickness of the second fairing part 40 is significantly greater than the thickness of the first fairing part 20. Consequently, a step that is directed, in particular, opposite to the flow direction SR on the front end of the second fairing part 40 is once again created between the first fairing part 20 and the second fairing part 40. Such a step has very negative effects with respect to the erosion and therefore the stability of a fairing device 10, and an adjustment device 70 is furthermore provided in order to avoid this step. The adjustment device 70 according to FIGS. 4a to 4c is realized in the form of a set screw. This set screw features an external thread that engages into an internal thread provided in an opening in the connecting section 26 of the first fairing part 20. In FIG. 4a, the adjustment device 70, particularly the set screw, is illustrated in an inserted, but not yet activated position.

FIG. 4b shows the start of the activation of the adjustment device 70. In this case, the set screw is screwed into the opening in the connecting section 26 of the first fairing part 20 along the threaded guide until it comes in contact with the outer side 40a of the second fairing part 40. An adjustment of the connecting section 26 of the first fairing part 20 is carried out by additionally turning and therefore screwing the set screw further into the threaded guide. This adjustment is realized by bending the connecting section 26 relative to the main body of the fairing part 20. FIG. 4c shows the final state, i.e., the state in which the set screw of the adjustment device 70 is completely screwed in. In this case, the connecting section 26 was pressed so far away from the outer side 40a of the second fairing part 40 that a transition with essentially no step results between the first fairing part 20 and the second fairing part 40 in the flow direction SR.

FIGS. 5a to 5c show an embodiment that corresponds to FIGS. 4a to 4c, but the adjustment of a transition without a step takes place in the opposite direction. In this embodiment, the thickness of the first fairing part 20 is significantly greater than the thickness of the second fairing part 40. An adjustment device 70 is also provided in order to realize a compensation in this respect.

The initial situation is illustrated in FIG. 5a. The connecting section 26 of the first fairing part 20 is essentially realized in a wedge-shaped fashion and extends above the overlapping section 46 of the second fairing part 40 in the still non-bent initial position. The adjustment device 70 is used for reducing the relatively large distance that still exists between the connecting section 26 and the outer side 40a of the second fairing part 40 in FIG. 5a and causes a step to be formed on the rear edge section of the first fairing part 20.

The adjustment device 70 of this embodiment is realized in the form of a latching mechanism by means of a hole-pin combination. In this case, a pin-shaped extension or several pin-shaped extensions is/are provided on the inner side 20b of the first fairing part 20 in the area of the connecting section 26. Depressions or pocket hole openings are provided in the outer side 40a of the second fairing part 40 such that they correspond to these pins. Latching tabs that correspond to a corresponding latching tab of the pin extensions on the connecting section 26 of the first fairing part 20 are provided in these depressions. This correspondence is realized such that latching takes place due to a relative movement of the pin element into the pocket hole or into the depression, namely such that the pin can be moved into the pocket hole or into the depression, but no longer be pulled out or only pulled out with the aid of a corresponding tool.

After the installation of the two fairing parts 20 and 40, i.e., after fixing their position relative to one another, through the two openings 28 and 48 of the mounting device 60, the step between the two fairing parts is reduced. This is realized by moving the connecting section 26 toward the outer side 40a of the second fairing part 40. In this case, the connecting section 26 is simply pressed toward the outer side 40a of the second fairing part 40. During this process, the pin shaped extension of the adjustment device 70 moves into the corresponding depression of the second fairing part 40 and the latching elements engage. This process ends in a situation that is illustrated in FIG. 5c, i.e., when the inner side 20b of the connecting section 26 lies on the outer side 40a of the overlapping section 46 of the second fairing part 40. In this case, the latching of the tabs of the adjustment device 70 advantageously ensures that the connecting section 26 irreversibly remains in this position and the step between the two fairing parts 20 and 40 therefore is reduced to a minimum.

FIG. 6 shows an isometric view of the situation prior to the installation of a fairing device 10. In this figure, a first fairing part 20 is arranged on the left side and a second fairing part 40 is arranged on the right side. Both fairing parts 20 and 40 feature openings 28 and 48, both of which are realized in the form of elongated holes 29 and 49. The two elongated holes correspond to one another in the installed state or during the installation of the two fairing parts 20 and 40. During the installation, the first fairing part 20 is moved into its intended position. Subsequently, the first fairing part 20 is moved into its intended position such that the two elongated holes 29 and 49 correspond to one another. This correspondence is characterized in that a mounting element 62 that is not illustrated in FIG. 6 can be pushed through these two elongated holes 29 and 49. The two fairing parts 20 and 40 can still be moved relative to one another regardless of the insertion of the mounting element 62. This moveability therefore makes it possible for both fairing parts 20 and 40 to contact one another in the desired position and to still realize the mounting through the elongated holes 29 and 49 by means of a mounting element 62 without requiring an exact correlation of the positions of the two openings 28 and 48 in the two fairing parts 20 and 40.

FIG. 7 shows a modified embodiment of FIG. 6. In this case, the two elongated holes 29 and 49 are oriented such that they extend perpendicular to one another or contrary, wherein the elongated hole 29 in the first fairing part 20 essentially extends, in particular, along the flow direction SR and the elongated hole 49 in the second fairing part 40 essentially extends transverse to the flow direction SR. Such an embodiment has the advantage that a tolerance deviation between the two fairing parts 20 and 40 can be compensated in the flow direction, as well as transverse to the flow direction. In other words, a two-dimensional adjustability is provided. The flexibility of use of such an embodiment therefore is even greater.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An aerodynamic exterior fairing device of an aircraft structure, comprising:

at least one first fairing part that has an outer side forming a first exterior flow contour, the at least one first fairing part comprising a first fairing section and a first connecting section, and a second fairing part that has an outer side forming a second exterior flow contour, the second fairing part comprising a second fairing section and a second connecting section, wherein at least a portion of the first connecting section of the first fairing part at least partially covers the second fairing part in an overlapping section, wherein a contour of an outer side of the overlapping section of the second connecting section of the second fairing part and an interior contour of an inner side of the first connecting section of the first fairing part are at least sectionally adapted to one another with respect to their shape in the overlapping section, wherein the first fairing part and the second fairing part each include a mounting device for receiving at least one connecting element for thus connecting the fairing parts, wherein the mounting device of the first fairing part and the mounting device of the second fairing part are each formed as at least one opening, wherein the mounting device of one of the first fairing part or the second fairing part includes at least one opening formed as an elongated hole that corresponds to an opening in the opposing section, and wherein the at least one connecting element is designed such that the at least one connecting element can be inserted into the openings of the two fairing parts in order to connect said fairing parts while still allowing selective movement of the first fairing part relative to the second fairing part, wherein elongation of the elongated hole extends in a direction parallel to the outer side of the first or second fairing part, and the elongated hole is designed such that the selective movement of the first fairing part relative to the second fairing part is along the elongation of the elongated hole, and wherein both fairing parts respectively feature at least one opening formed as an elongated hole and elongation of the respective elongated holes is perpendicular.

2. The aerodynamic exterior fairing device according to claim 1, further comprising an adjustment device that is designed in such a way that a distance between the outer side of the overlapping section of the second fairing part and the inner side of the connecting section of the first fairing part can be adjusted.

3. The aerodynamic exterior fairing device according to claim 1, wherein the inner side of the connecting section of the first fairing part or the outer side of the overlapping section of the second fairing part at least sectionally has a surface with a reduced coefficient of friction.

4. An aircraft component arrangement with an aerodynamic exterior fairing device for creating an aerodynamic exterior cover of an area of an aircraft structure, with the exterior fairing device comprising:

at least one first fairing part that has an outer side forming a first exterior flow contour, the at least one first fairing part comprising a first fairing section and a first connecting section, and a second fairing part that has an outer side forming a second exterior flow contour, the second fairing part comprising a second connecting section, wherein at least a portion of the first connecting section of the first fairing part at least partially covers the second fairing part in an overlapping section, wherein a contour of the outer side and a contour of an inner side of the connecting section of the first fairing part are at least sectionally adapted to one another with respect to their shape in the overlapping section, wherein the first fairing part and the second fairing part respectively feature a mounting device for receiving at least one connecting element for thus connecting the fairing parts, wherein the mounting device of the first fairing part and the mounting device of the second fairing part are each formed as at least one opening, wherein the mounting device of one of the first fairing part or the second fairing part includes at least one opening formed as an elongated hole that corresponds to an opening in the opposing section, and wherein the at least one connecting element is designed such that the at least one connecting element can be inserted into the openings of the two fairing parts in order to connect the fairing parts while still allowing selective movement of the first fairing part relative to the second fairing part, and wherein elongation of the elongated hole extends in a direction parallel to the outer side of the first or second fairing part, and the elongated hole is designed such that the selective movement of the first fairing part relative to the second fairing part is along the elongation of the elongated hole, wherein a shape of the second fairing part is realized in such a way that the second fairing part contacts the aircraft structure on an inner side such that the first and the second fairing part can be mounted on the aircraft structure in a connected state by the at least one connecting element, and wherein both fairing parts respectively feature at least one opening formed as an elongated hole and elongation of the respective elongated holes is perpendicular.

5. The aircraft component arrangement according to claim 4, wherein one or both of the connecting section of the first fairing part or the overlapping section of the second fairing part is realized in such a way that, when arranging the second fairing part behind a rear edge section of the first fairing part with reference to the flow direction, a transition without a step is formed between the two fairing parts due to overlap between the connecting section and the overlapping section.

6. A method for installing an aerodynamic exterior fairing device on a structural component of an aircraft structure, the method comprising:

providing at least one first fairing part and at least one second fairing part, arranging the second fairing part on and in a predetermined position relative to the structural component, arranging the first fairing part on the structural component such that an inner side of a first connecting section of the first fairing part at least sectionally lies opposite of an outer side of an overlapping section of a second connecting section of the second fairing part, mounting the first fairing part and the second fairing part on the structural component with a mounting device that is configured for receiving at least one connecting element for thus connecting the fairing parts, wherein the mounting device is formed as at least one opening formed as an elongated hole that corresponds to an opening in the opposing section, and wherein the at least one connecting element can be inserted into the openings in order to connect the fairing parts while still allowing selective movement of the first fairing part relative to the second fairing part, wherein elongation of the elongated hole extends in a direction parallel to the outer side of the first or second fairing part, and the elongated hole is designed such that the selective movement of the first fairing part relative to the second fairing part is along the elongation of the elongated hole, and wherein both fairing parts respectively feature at least one opening formed as an elongated hole and elongation of the respective elongated holes is perpendicular.

* * * * *